United States Patent [19]

Elovic

[11] 4,254,618
[45] Mar. 10, 1981

[54] COOLING AIR COOLER FOR A GAS TURBOFAN ENGINE

[75] Inventor: Ernest Elovic, Cincinnati, Ohio

[73] Assignee: General Electric Company, Cincinnati, Ohio

[21] Appl. No.: 825,614

[22] Filed: Aug. 18, 1977

[51] Int. Cl.² .......................... F02K 3/02; F02C 7/12
[52] U.S. Cl. .................................. 60/226 R; 60/728; 60/39.83; 60/266
[58] Field of Search ............... 60/226 R, 39.67, 39.66, 60/266

[56] References Cited

U.S. PATENT DOCUMENTS

| | | | |
|---|---|---|---|
| 3,034,298 | 5/1962 | White | 60/39.66 |
| 3,224,194 | 12/1965 | De Feo et al. | 60/39.67 |
| 3,528,250 | 9/1970 | Johnson | 60/266 |
| 3,584,458 | 6/1971 | Wetzler | 60/39.66 |
| 3,651,645 | 3/1972 | Grieb | 60/39.66 |
| 3,797,561 | 3/1974 | Clark et al. | 60/226 R |
| 3,842,597 | 10/1974 | Ehrich | 60/226 R |

*Primary Examiner*—Douglas Hart
*Attorney, Agent, or Firm*—Robert C. Lampe, Jr.; Donald W. Walk; Derek P. Lawrence

[57] ABSTRACT

An air-to-air heat exchanger is provided for a gas turbofan engine to significantly reduce the quantity of cooling air that is presently needed to effectively cool the hot turbine parts. Typically, the turbine is internally cooled with air bled from the compressor which, though cooler than the turbine, has been heated due to the work done on it by the compressor. In accordance with the present invention, the heat exchanger is located internally of the bypass duct to place in heat exchange relationship a captured portion of the relatively cool bypass flow and this warmer compressor bleed air, thereby cooling the turbine coolant and significantly reducing the amount of such coolant required. This results in a decrease in engine specific fuel consumption.

2 Claims, 3 Drawing Figures

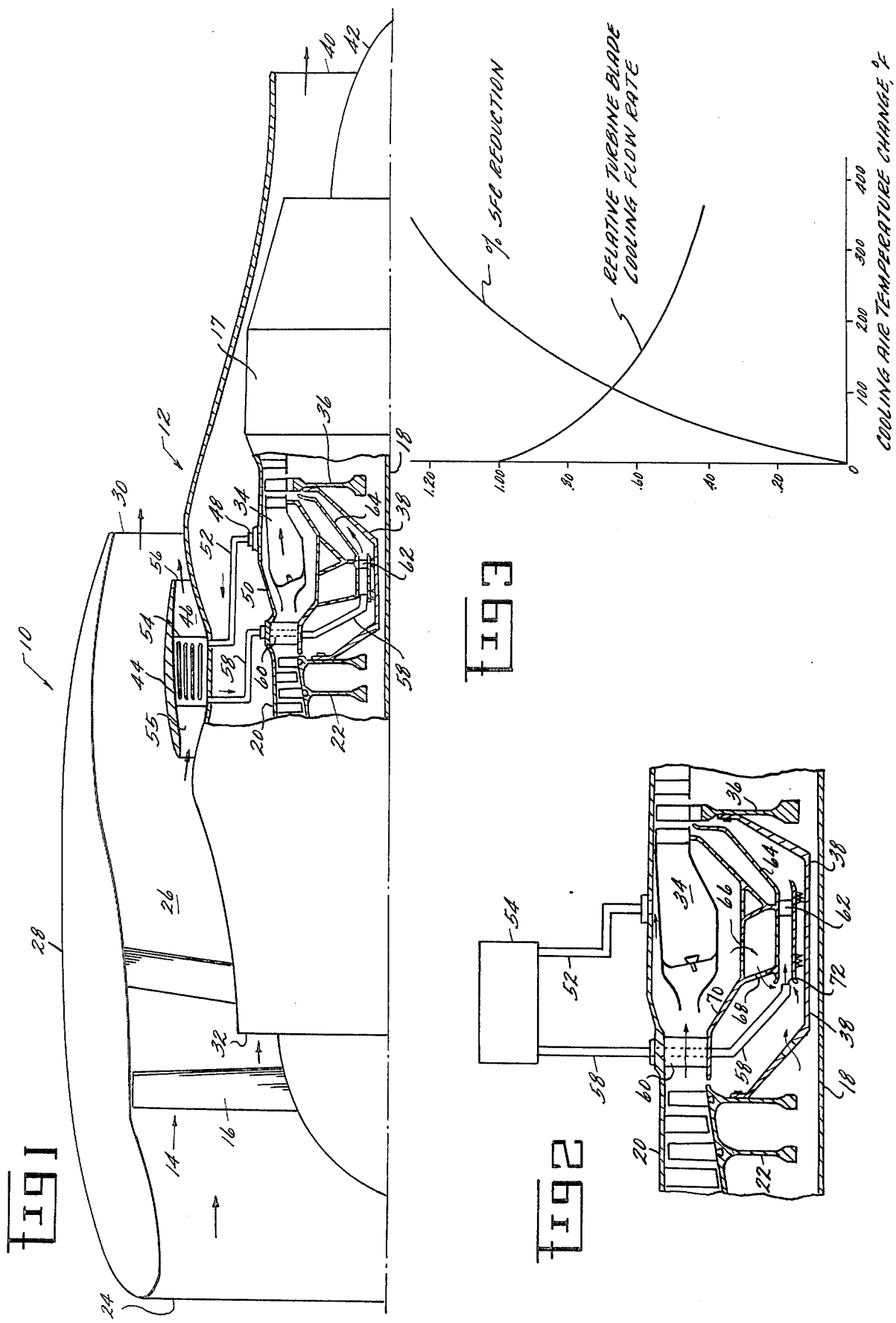

COOLING AIR COOLER FOR A GAS TURBOFAN ENGINE

BACKGROUND OF THE INVENTION

This invention relates to gas turbines and, more particularly, to a concept for efficiently reducing the temperature of air used to cool high temperature turbines in gas turbofan engines.

Modern aircraft gas turbofan engines operate at turbine inlet air temperature levels which are beyond the structural temperature capabilities of high temperature alloys. Hence, engine hot flow path components and, in particular, turbine blades and vanes must be cooled in order to assure their structural integrity in order to meet operating life requirements. It is well understood that gas turbine engine shaft horsepower and specific fuel consumption (which is the rate of fuel consumption per unit of power output) can be improved by increasing turbine inlet temperature. In order to take advantage of this potential performance improvement, modern turbine cooling technology utilizes air-cooled, hollow turbine nozzle vanes and blades to permit operation at inlet gas temperatures in excess of 2000° F. (1094° C.). In general, these sophisticated methods of turbine cooling have utilized compressor discharge or interstage bleed air as a coolant. However, the benefits obtained from sophisticated air-cooling techniques are at least partially offset by the extraction of the necessary cooling air from the propulsive cycle. It can be appreciated that the cooling airflow rate required is a function of the hot gas temperature, increasing with increasing hot gas temperature. Furthermore, the compressor bleed air used for cooling must bypass the combustor and one or more turbine stages, thus giving rise to a performance penalty proportionate to the amount of cooling air utilized. More particularly, the air that is bled from the compressor and used as cooling air for the turbine rotor blades has had work done on it by the compressor. However, because it is normally returned into the flow path gas stream downstream of the turbine nozzle, it does not return its full measure of work to the cycle as it expands through the turbine. Additionally, the reintroduction of cooling air into the hot gas stream produces a loss in gas stream total pressure. This is a result of the momentum mixing losses associated with injecting relatively low total pressure cooling air into a high total pressure gas stream. Thus, the greater the amount of cooling air which is routed through the turbine blades, the greater the losses associated with the coolant become on the propulsive cycle. Thus, while turbine blade cooling has inherent advantages, it also has associated therewith certain inherent disadvantages which are functions of the quantity of cooling air used in cooling the turbine rotor blades.

It will, therefore, be appreciated that engine performance can be increased by reducing the amount of cooling air required by the turbine. Reducing the cooling airflow rate results in improved engine performance with a consequent reduction in specific fuel consumption, the actual magnitude of the cooling airflow rate and specific fuel consumption reductions which can be realized being a function of the specific engine application.

One method of reducing the amount of cooling air required by the turbine is to cool the cooling air entering the hot components. One widely advocated method of cooling the cooling air is to utilize the heat sink capability available in the engine fuel. In such a scheme, the relatively hot cooling air is placed in heat exchange relationship with the relatively cool engine fuel, thereby cooling the cooling air and heating the fuel. The energy extracted by the fuel is reintroduced back into the propulsive cycle as the heated fuel is burned in the combustor, thereby producing what has commonly been referred to as a "regenerative engine". While various studies indicate that fuel-air heat exchangers offer an advantage of small size and low weight, the fuels currently used in aircraft engines (JP4, JP5) are limited in their heat sink capacity, the available heat sink already being used largely to cool the engine oil. To obtain an additional heat sink capacity to permit cooling of the cooling air would require the use of special fuels such as JP7 or JP9, which are currently unavailable in commercial quantities. Additionally, the use of fuel in a fuel-air heat exchanger presents a potential fire hazard which may be unacceptable for commercial engine applications. It will, therefore, be appreciated that another technique for cooling the cooling air is required in order to reduce the coolant flow rate and thereby enhance overall engine performance.

SUMMARY OF THE INVENTION

Accordingly, it is the primary object of the present invention to provide for a reduction in the amount of cooling air required by the turbine of a gas turbofan engine by reducing the temperature of the cooling air passing therethrough in order to enhance overall engine performance.

This, and other objects and advantages, will be more clearly understood from the following detailed descriptions, the drawing and specific examples, all of which are intended to be typical of, rather than in any way limiting on, the scope of the present invention.

Briefly stated, the above objects are obtained in an aircraft gas turbofan engine by providing a heat exchanger wherein the turbine cooling air and relatively cooler air from the fan bypass duct are maintained in heat exchange relationship, thereby cooling the turbine cooling air. The turbine cooling air is bled, for example, from the discharge of the compressor through ports in the engine casing at various circumferential locations and is ducted to the heat exchanger which is disposed inwardly of the fan bypass portion of the gas turbine engine. The relatively cool fan bypass duct air is bled at the inner wall of the fan duct into a diffuser where the dynamic head of the fan stream is largely recovered. The fan bleed air is then ducted through the heat exchanger into heat exchange relationship with the relatively warmer compressor discharge bleed air, thereby absorbing heat from the cooling air, and returned to the fan bypass duct. The cooled compressor discharge bleed air is then routed to the high pressure turbine through the compressor rear frame struts and is expanded through an expander nozzle prior to cooling the high pressure turbine components. In an alternative embodiment of the present invention where the space available for ducting the cooling air through the compressor rear frame struts is limited, the cooling flow rates through the heat exchanger may be reduced by increasing the magnitude of the cooling air temperature reduction in the heat exchanger in direct proportion to the reduction in flow rates. The resulting over-cooled cooling air is then mixed with uncooled compressor discharge bleed air ahead of the expander nozzle to obtain the cooling air temperature reduction necessary to cool the turbine.

Incorporation of this heat exchanger into an aircraft gas turbofan engine permits a reduction in the quantity of air required for turbine cooling and, thus, provides an improvement in engine performance. Conversely, an increase in blade life can be achieved by maintaining the original coolant flow rate but by reducing the temperature of the coolant, with essentially no further degradation in engine performance.

BRIEF DESCRIPTION OF THE DRAWING

While the specification concludes with claims particularly pointing out and distinctly claiming the subject matter which is regarded as part of the present invention, it is believed that the invention will be more fully understood from the following description of the preferred embodiments which are given by way of example with the accompanying drawing in which:

FIG. 1 is a simplified cross-sectional view, in partial cutaway, of an aircraft gas turbofan incorporating the preferred embodiment of the subject invention and illustrating the relationship of the heat exchanger to the various other engine components;

FIG. 2 is a simplified cross-sectional view of a portion of the gas turbofan engine of FIG. 1 depicting an alternative embodiment of the cooling system of the present invention; and FIG. 3 graphically depicts the turbine relative cooling flow rate and specific fuel consumption reductions as a function of the change in cooling air temperature for the representative gas turbofan engine of FIG. 1.

DESCRIPTION OF THE PREFERRED EMBODIMENT

Referring to the drawing wherein like numerals correspond to like elements throughout, attention is first directed to FIG. 1 wherein a representative gas turbofan engine designated generally at 10, and which incorporates the present invention, is diagrammatically shown. While it is recognized that turbofan engines are, by now, well known in the art, a brief description of the operation of the engine will enhance appreciation of the interrelationship of the various components in light of the invention soon to be described. Basically, this engine may be considered as comprising a core engine 12, a fan 14 including a rotatable stage of fan blades 16 (only one of which is shown for clarity), and a fan turbine (not shown) downstream of the core engine in the area generally depicted as 17 and which is interconnected to the fan 14 by shaft 18. The core engine 12 includes an axial flow compressor 20 having a rotor 22. Air enters inlet 24 from the left of FIG. 1 and is initially compressed by the fan blades 16. A first portion of this relatively cool compressed air enters the fan bypass duct 26 defined, in part, by core engine 12 and a circumscribing fan cowl or nacelle 28 and discharges through a fan nozzle 30. A second portion of the compressed air enters core engine inlet 32, is further compressed by the axial flow compressor 20 and is discharged to a combustor 34 where it is mixed with fuel and burned to provide high energy combustion gases which drive a core engine turbine 36. The turbine 36, in turn, drives the rotor 22 through a shaft 38 in the usual manner of a gas turbine engine. The hot gases of combustion then pass through and drive the fan turbine which, in turn, drives the fan 14. A propulsive force is thus obtained by the action of the fan 14 discharging air from the fan bypass duct 26 through the fan nozzle 30 and by the discharge of combustion gases from a core engine nozzle 40 defined, in part, by plug 42. The above description is typical of many present-day gas turbofan engines and is not meant to be limiting to the present invention, as it will become readily apparent from the following description that the present invention is capable of application to any gas turbofan engine of the bypass variety and is not necessarily restricted to use with the particular configuration depicted herein. The foregoing description of the operation of the engine depicted in FIG. 1 is, therefore, merely meant to be illustrative of one type of application.

It is also well understood that gas turbine engine shaft horsepower and specific fuel consumption (which is the rate of fuel consumption per unit of power output) can be improved by increasing the temperature at the inlet to the core engine turbine 36 (sometimes referred to as the "high pressure turbine"). However, since modern aircraft turbofan engines operate at turbine inlet air temperature levels which are beyond the structural temperature capabilities of high temperature alloys, turbine 36 must be cooled to assure its structural integrity. It can, therefore, be appreciated that as the temperature of the hot exhaust gases exiting combustor 34 is increased, an increased percentage of cooling air is required to cool the turbine. Traditionally, the source of the coolant for the turbine 36 has been air bled from the discharge of compressor 20 which is routed to and through the turbine in a manner well known in the art. The compressor discharge has been the logical choice for the coolant flow since the pressure of the compressor discharge airflow (referred to hereinafter as the "cooling air") is high enough to drive the cooling air through the tortuous path associated with the turbine structure. However, because the cooling air has had work performed on it by the compressor, its temperature level has been increased. And, as compressor compression ratios are increased, and as aircraft velocities increase, a corresponding rise in the temperature of the cooling air is experienced. As a result, an increasingly higher percentage of cooling flow is required to cool the turbine to acceptable temperature levels. As mentioned earlier, this cooling air must bypass the combustor and perhaps one or more turbine stages before being returned to the propulsive cycle, thus giving rise to a performance penalty in proportion to the amount of cooling air used. It thus becomes advantageous to reduce the amount of cooling air required.

Referring now to FIG. 3 there is depicted in graphical form the change in turbine relative cooling flow rates and specific fuel consumption as a function of the change in cooling air temperature for a typical gas turbofan engine of the variety depicted in FIG. 1. As an illustration, an estimate of the cooling airflow and specific fuel consumption reductions that can be realized by cooling the turbine blade cooling air of a two-stage core engine turbine of current design is shown in FIG. 3. It may be observed from the figure that in this particular application, reducing the cooling air temperature by 250° F. results in a 50 percent reduction in the required cooling airflow rate with a corresponding reduction of 1.1 percent in specific fuel consumption. It is clear from this simplistic example that great benefits can be obtained by reducing the temperature of the turbine cooling air.

The present invention contemplates the use of the relatively cool fan bypass stream as a heat sink to cool the cooling air. Referring again to FIG. 1, it may be seen that the engine is provided with a means for capturing a portion of the relatively cool bypass flow such as, for example, shroud 44 which circumscribes a portion of the length of core engine 12 within the bypass duct to define a flow passage 46 (perhaps in the form of an annulus) therebetween. Disposed within this passage is a heat exchanger 54, preferably of the cross-flow tubular type which is described in greater particularity in the copending patent applications of Thomas G. Wakeman, Ser. No. 849,139, filed on Oct. 14, 1977, issued on Oct. 17, 1978, as U.S. Pat. No. 4,020,150, and Ser. No. 797,669 filed on May 17, 1977. Turbine cooling air is bled from the compressor discharge through ports 48 in the core engine casing 50 at various circumferential locations and routed through at least one conduit 52 to the heat exchanger 54. The bypass air portion captured by shroud 44 enters a diffuser section 55 where the dynamic head of the captured portion is largely recovered and ducted through the heat exchanger 20 where it absorbs heat from the turbine cooling air. This bypass air portion is then returned to the fan duct at the discharge 56 of passage 46. The cooling air thus cooled is routed via conduit 58 to the high pressure turbine 36 through compressor rear frame struts 60 and thereafter to the expander nozzle 62 of a type taught by U.S. Pat. No. 3,565,545, issued to Melvin Bobo et al, which is assigned to the assignee of the present invention. The cooled cooling air then travels via passageway 64 to turbine 36 where it is used to perform the cooling function in a manner well known in the art.

In order to permit the efficient return of the heated bypass flow portion back into bypass duct 26 upstream of fan nozzle 30, its static pressure must be matched to the static pressure in the bypass duct at location 56 where the bleed portion is reintroduced. Thus, the total pressure drop of the bled portion, including the pressure drop through the diffuser section 55, heat exchanger 54 and flow passage 46 must be limited to a value less than or equal to the dynamic head of the remainder of the bypass flow stream at the location where the bled portion is reintroduced into the fan duct.

If, as is the case in existing gas turbofan engines for which the present invention may wish to be adapted, the space available for ducting through the compressor rear frame struts 60 is limited, the configuration of FIG. 1 may be modified as in FIG. 2 by reducing the cooling flow rate ducted through heat exchanger 54 and increasing the magnitude of the cooling air temperature reduction in direct proportion to the reduction in flow rate. While this design approach reduces the size of the required ducting 58, it will generally result in some increase in heat exchanger weight in order to increase the effectiveness of the heat exchanger. In such an embodiment, an auxiliary hot flow of cooling air is bled from the core engine through apertures 66 and 68 in core engine inner casing structure 70. This uncooled auxiliary bleed air is mixed with the cooled cooling air exiting the downstream end 72 of conduit 58 ahead of the expander nozzle 62 to obtain the desired final cooling air temperature. The resulting mixture is then utilized to cool the hot turbine components as in FIG. 1 and in accordance with well known turbine cooling principles.

It thus becomes clear from the foregoing descriptions that the stated objects of the present invention have been attained in the embodiments as depicted and that an engine configured in accordance with the present invention will have significant performance benefits over prior art gas turbofan engines. In particular, reliance has been placed on the well-established concept of utilizing compressor bleed air as a turbine blade coolant. However, the amount of compressor bleed air required has been substantially reduced, thereby enhancing overall cycle performance. Conversely, an increase in blade life can be achieved by maintaining the original coolant flow rate but by reducing the temperature of the coolant, with essentially no further degradation in engine performance. Furthermore, the present invention is readily adaptable to existing gas turbofan engines in that the components may be designed and placed in the engine in such a manner that they do not substantially change the configuration or design of nearby existing structure. Furthermore, the heat exchanger is of the air-to-air variety and is completely independent of the need for highly volatile coolant fluid which characterize prior art turbine cooling concepts.

It should become obvious to one skilled in the art that certain changes can be made to the above-described invention without departing from the broad inventive concepts thereof. For example, while the present invention contemplates the cooling of the turbine coolant by placing it in heat exchange relationship with the abundant supply of fan bypass air in the gas turbofan engine, the particular configuration of the heat exchanger may take many forms, such as heat exchangers of the single or multiple-pass variety. Furthermore, it may be desirable to extract the cooling air from the compressor 20 at a location other than the compressor discharge. In addition, the present invention may be used to cool the cooling air required for any of a number of high temperature turbine components and is not limited to cooling the cooling air required for turbine blades and vanes. It is intended that the appended claims cover all such variations in the present invention's broader inventive concepts.

Having thus described the invention, what is claimed as novel and desired to be secured by Letters Patent of the United States is:

1. In a gas turbine engine of the bypass variety having a fan for pressurizing a cool flow of fan bypass air; a core engine including a compressor for pressurizing a hot flow of cooling air; a turbine of the air cooled variety; a heat exchanger for receiving a portion of the cool bypass air and a portion of the hot cooling air, wherein heat is transferred directly from the hot cooling air portion to the bypass air portion thereby resulting in a flow of cooled cooling air; and a means for routing the cooled cooling air to the turbine for turbine cooling; an improvement comprising:

a duct for routing the bypass air around the core engine;

means for capturing a portion of the bypass air from said duct, said capturing means defining a flow passage having a diffuser section to substantially recover the dynamic head of the fan bypass portion, and wherein said heat exchanger is disposed within said passage downstream of said diffuser section.

2. The improved gas turbine engine, as recited in claim 1, wherein said capturing means defining said flow passage returns the captured portion of the fan bypass air to said duct upstream of a fan nozzle.

* * * * *